United States Patent
Yednak, III

(10) Patent No.: US 7,946,762 B2
(45) Date of Patent: May 24, 2011

(54) THERMOCOUPLE

(75) Inventor: Andy Michael Yednak, III, Phoenix, AZ (US)

(73) Assignee: ASM America, Inc., Phoenix, AZ (US)

( * ) Notice: Subject to any disclaimer, the term of this patent is extended or adjusted under 35 U.S.C. 154(b) by 392 days.

(21) Appl. No.: 12/140,809

(22) Filed: Jun. 17, 2008

(65) Prior Publication Data

US 2009/0308425 A1 Dec. 17, 2009

(51) Int. Cl.
*G01K 1/00* (2006.01)
*G01K 7/00* (2006.01)

(52) U.S. Cl. .................. 374/179; 374/208; 136/230

(58) Field of Classification Search .................. 374/179, 374/208; 136/230
See application file for complete search history.

(56) References Cited

U.S. PATENT DOCUMENTS

| | | | |
|---|---|---|---|
| 154,695 A | 9/1874 | Manly | |
| 2,059,480 A | 11/1936 | Obermaier | |
| 2,266,416 A | 12/1941 | Duclos | |
| 3,011,006 A | 11/1961 | Nicholson | |
| 3,913,058 A | 10/1975 | Nishio et al. | |
| 4,217,463 A | 8/1980 | Swearingen | |
| 4,377,347 A | 3/1983 | Hanmyo et al. | |
| 4,527,005 A | 7/1985 | Mckelvey et al. | |
| 4,592,307 A | 6/1986 | Jolly | |
| 4,692,556 A | 9/1987 | Bollen et al. | |
| 4,721,533 A | 1/1988 | Phillippi et al. | |
| 4,749,416 A | 6/1988 | Greenspan | |
| 4,976,996 A | 12/1990 | Monkowski et al. | |
| 4,978,567 A | 12/1990 | Miller | |
| 4,984,904 A | 1/1991 | Nakano et al. | |
| 4,989,992 A | 2/1991 | Piai | |
| 5,027,746 A | 7/1991 | Frijlink | |
| 5,065,698 A | 11/1991 | Koike | |
| 5,104,514 A | 4/1992 | Quartarone | |
| 5,158,128 A | 10/1992 | Inoue et al. | |
| 5,181,779 A | 1/1993 | Shia | |
| 5,246,500 A | 9/1993 | Samata et al. | |

(Continued)

FOREIGN PATENT DOCUMENTS

EP 0229488 7/1987

(Continued)

OTHER PUBLICATIONS

Non-Final Office Action for U.S. Appl. No. 12/121,085 dated Apr. 28, 2010.

(Continued)

*Primary Examiner* — Lisa M Caputo
*Assistant Examiner* — Mirellys Jagan
(74) *Attorney, Agent, or Firm* — Snell & Wilmer L.L.P.

(57) ABSTRACT

A thermocouple for use in a semiconductor processing reactor is described. The thermocouple includes a sheath having a measuring tip at one end and an opening at the other end. A support member having bores formed along the length is disposed within the sheath. A pair of wires formed of dissimilar metals are disposed within the bores, and one end of the wires is fused together to form a junction. The wires extend along the length of the bores. As the wires exit the bore, they are spatially or physically separated to prevent a short circuit therebetween. The ends of the wires exiting the bore are also free to thermally expand in the longitudinal manner, thereby reducing or eliminating the potential for the wires to fail due to grain slip.

10 Claims, 6 Drawing Sheets

U.S. PATENT DOCUMENTS

| | | | |
|---|---|---|---|
| 5,271,967 | A | 12/1993 | Kramer et al. |
| 5,315,092 | A | 5/1994 | Takahashi et al. |
| 5,336,327 | A | 8/1994 | Lee |
| 5,360,269 | A | 11/1994 | Ogawa et al. |
| 5,421,893 | A | 6/1995 | Perlov |
| 5,456,761 | A | 10/1995 | Auger et al. |
| 5,474,618 | A | 12/1995 | Allaire |
| 5,493,987 | A | 2/1996 | McDiarmid et al. |
| 5,514,439 | A | 5/1996 | Sibley |
| 5,562,774 | A | 10/1996 | Breidenbach et al. |
| 5,571,333 | A | 11/1996 | Kanaya |
| 5,697,706 | A | 12/1997 | Ciaravino et al. |
| 5,788,799 | A | 8/1998 | Steger et al. |
| 5,902,407 | A | 5/1999 | deBoer et al. |
| 5,904,778 | A | 5/1999 | Lu et al. |
| 5,910,221 | A | 6/1999 | Wu |
| 6,056,823 | A | 5/2000 | Sajoto et al. |
| 6,066,209 | A | 5/2000 | Sajoto et al. |
| 6,120,640 | A | 9/2000 | Shih et al. |
| 6,129,808 | A | 10/2000 | Wicker et al. |
| 6,170,429 | B1 | 1/2001 | Schoepp et al. |
| 6,227,140 | B1 | 5/2001 | Kennedy |
| 6,325,858 | B1 | 12/2001 | Wengert et al. |
| 6,342,691 | B1 | 1/2002 | Johnsgard et al. |
| 7,008,802 | B2 | 3/2006 | Lu |
| 7,166,165 | B2 | 1/2007 | Halpin |
| 2002/0011211 | A1 | 1/2002 | Halpin |
| 2002/0043337 | A1 | 4/2002 | Goodman et al. |
| 2003/0002562 | A1 | 1/2003 | Yerlikaya et al. |
| 2003/0035905 | A1 | 2/2003 | Lieberman et al. |
| 2005/0101843 | A1 | 5/2005 | Quinn et al. |
| 2005/0141591 | A1 | 6/2005 | Sakano |
| 2008/0205483 | A1* | 8/2008 | Rempe et al. ............ 374/179 |
| 2008/0289574 | A1* | 11/2008 | Jacobs et al. ............ 118/708 |
| 2009/0052498 | A1* | 2/2009 | Halpin et al. ............ 374/179 |
| 2009/0159000 | A1* | 6/2009 | Aggarwal et al. ........ 118/666 |
| 2010/0145547 | A1* | 6/2010 | Darabnia et al. ......... 700/300 |

FOREIGN PATENT DOCUMENTS

| | | |
|---|---|---|
| EP | 0723141 | 7/1996 |
| FR | 1408266 | 8/1965 |
| GB | 0752277 | 7/1956 |
| JP | 05-023079 | 3/1993 |
| JP | 5-64627 | 3/1993 |
| JP | 09089676 | 4/1997 |
| JP | 10-153494 | 6/1998 |
| JP | 10-227703 | 8/1998 |
| JP | 11-118615 | 4/1999 |
| JP | 11-183264 | 7/1999 |
| JP | 11-183265 | 7/1999 |
| JP | 11-287715 | 10/1999 |
| JP | 2004113270 | 4/2004 |
| JP | 2005-172489 | 6/2005 |
| JP | 2006-090762 | 4/2006 |
| JP | 2006-153706 | 6/2006 |
| KR | 10-2000-0031098 | 6/2000 |
| KR | 10-2002-0086763 | 11/2002 |
| KR | 10-2003-0092305 | 12/2003 |
| WO | 9531582 | 11/1995 |
| WO | 9706288 | 2/1997 |
| WO | 9923276 | 5/1999 |
| WO | 0111223 | 2/2001 |

OTHER PUBLICATIONS

International Search Report and Written Opinion for International Application No. PCT/US2010/033244 dated Jun. 29, 2010.

International Search Report and Written Opinion for International Application No. PCT/US2009/066377 dated Jul. 1, 2010.

PCT Notification of Transmittal of the International Search Report and The Written Opinion of the International Searching Authority, or the Declaration, dated Mar. 5, 2009, for International App. No. PCT/US2008/074063.

PCT Notification of Transmittal of the International Search Report and The Written Opinion of the International Searching Authority, or the Declaration, dated Nov. 27, 2009, for International App. No. PCT/US2009/043454.

Linke, J. and Vietzke, E., "Behavior of Boron Doped Graphites, Plasma Sprayed Boron Carbides and a-C/B H as Plasma Facing Material," J. Fusion Tech., V.20, pp. 228-231 (Sep. 1991).

Notice of Allowance dated Jul. 26, 2010 in U.S. Appl. No. 12/121,085.

Notice of Allowance dated Oct. 4, 2010 in U.S. Appl. No. 12/121,085.

CN; Office Action dated Jul. 14, 2010 in Application No. 200880012927.X.

PCT; International Search Report and Written Opinion dated Jul. 29, 2010 in Application No. PCT/US2010/033248.

Introduction to Materials Science for Engineers, 3rd Ed., James F. Schackelford, pp. 398, Macmillan Publishing Co. (1992).

Ponnekanti et al., "Failure Mechanisms of Anodized Aluminum Parts Used in Chemical Vapor Deposition Chambers," J. Vac. Sci. Technol. A 14(3) (May 1, 1996).

"Thermocouples for Silicon Process Technologies," Vulcan Electric Company brochure.

"Thermocouples for the Semiconductor Industry," Engelhard Corporation brochure (2004).

PCT Notification of Transmittal of the International Search Report and The Written Opinion of the International Searching Authority, or the Declaration, dated Aug. 21, 2008, for International App. No. PCT/US2008/063919.

* cited by examiner

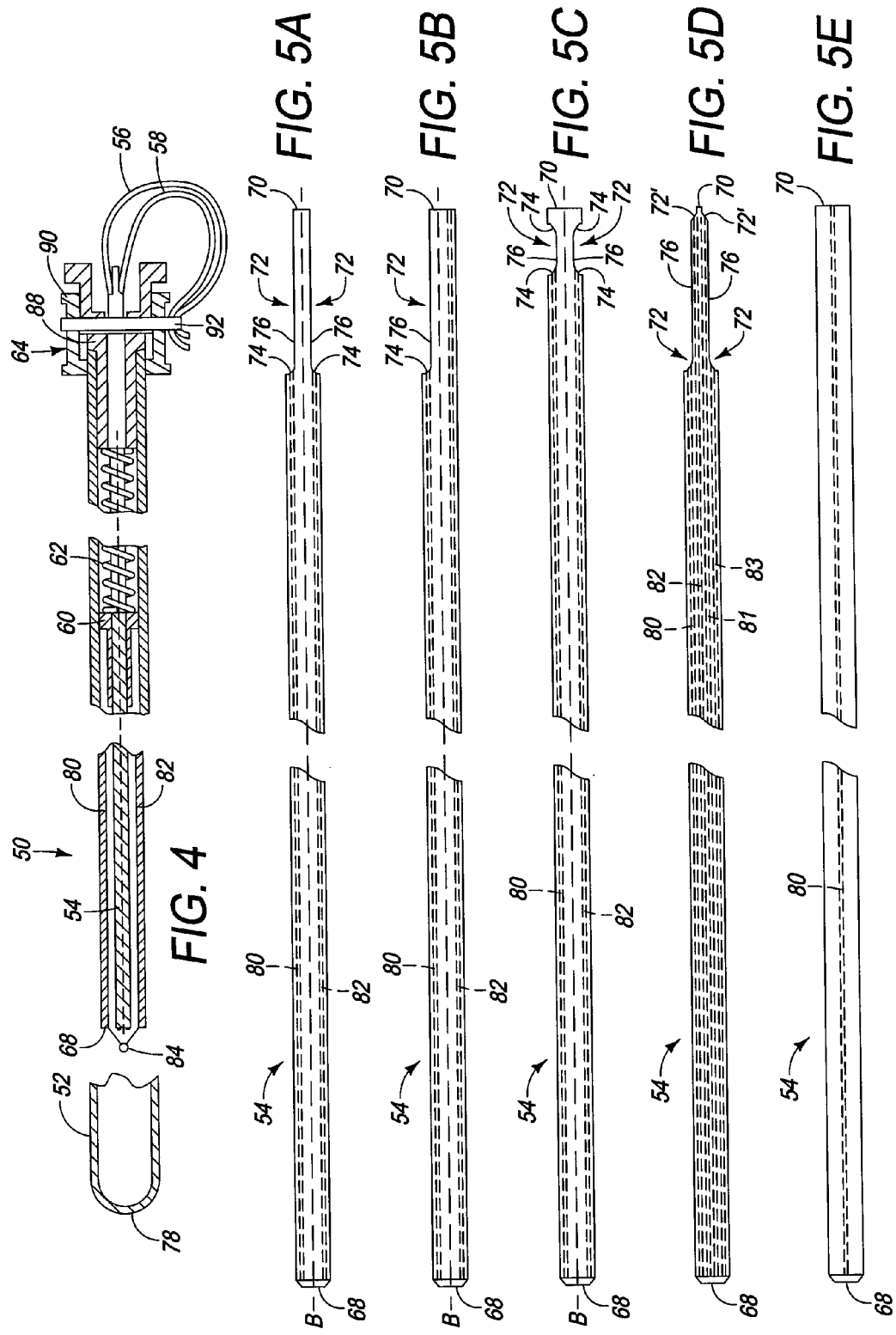

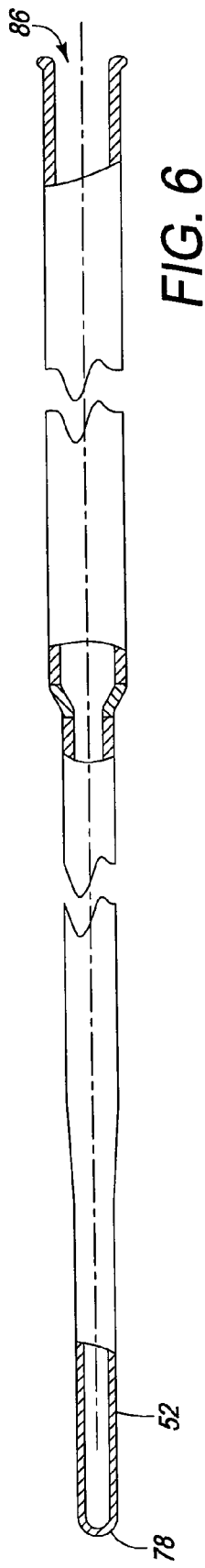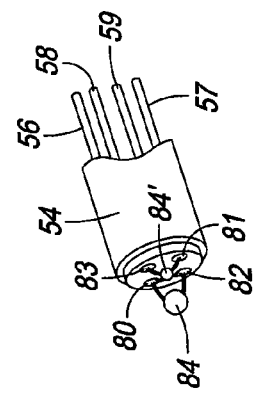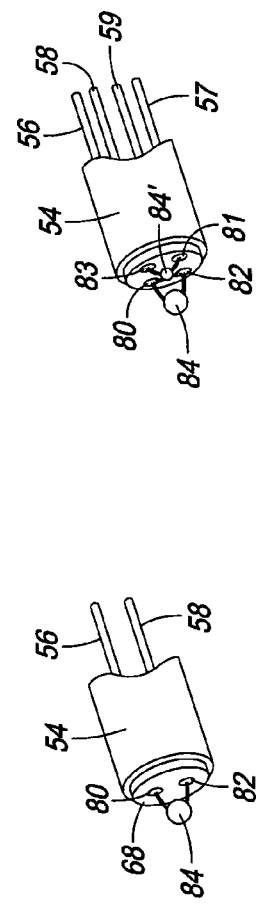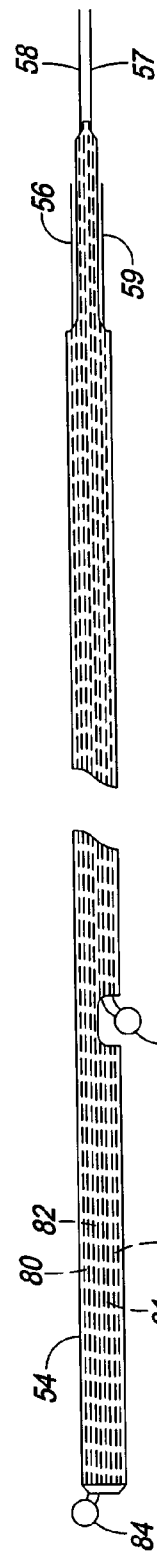

THERMOCOUPLE

FIELD OF THE INVENTION

The present invention relates to a temperature sensor, and more particularly to a temperature sensor configured to enhance accuracy of temperature control in a semiconductor processing apparatus.

BACKGROUND OF THE INVENTION

High-temperature semiconductor processing chambers are used for depositing various material layers onto a substrate surface or surfaces. One or more substrates or workpieces, such as silicon wafers, are placed on a workpiece support within the processing chamber. Both the substrate and workpiece support are heated to a desired temperature. In a typical processing step, reactant gases are passed over each heated substrate, whereby a chemical vapor deposition (CVD) reaction deposits a thin layer of the reactant material in the reactant gases on the substrate surface(s). Through subsequent processes, these layers are made into integrated circuits, and tens to thousands or even millions of integrated devices, depending on the size of the substrate and the complexity of the circuits.

Various process parameters must be carefully controlled to ensure the high quality of the resulting deposited layers. One such critical parameter is the temperature of the substrate during each processing step. During CVD, for example, the deposition gases react at particular temperatures to deposit the thin layer on the substrate. If the temperature varies greatly across the surface of the substrate, the deposited layer could be uneven which may result in unusable areas on the surface of the finished substrate. Accordingly, it is important that the substrate temperature be stable and uniform at the desired temperature before the reactant gases are introduced into the processing chamber.

Similarly, non-uniformity or instability of temperatures across a substrate during other thermal treatments can affect the uniformity of resulting structures on the surface of the substrate. Other processes for which temperature control can be critical include, but are not limited to, oxidation, nitridation, dopant diffusion, sputter depositions, photolithography, dry etching, plasma processes, and high temperature anneals.

Methods and systems are known for measuring the temperature at various locations near and immediately adjacent to the substrate being processed. Typically, thermocouples are disposed at various locations near the substrate being processed, and these thermocouples are operatively connected to a controller to assist in providing a more uniform temperature across the entire surface of the substrate. For example, U.S. Pat. No. 6,121,061 issued to Van Bilsen teaches a plurality of temperature sensors measuring the temperature at various points surrounding the substrate, including a thermocouple placed near the leading edge of the substrate, another near the trailing edge, one at a side, and another below the substrate near the center of the substrate.

However, thermocouples employed in measuring the temperature within the high-temperature processing chamber have been found to fail due to grain slip of the wires used in the thermocouple. The thermocouple typically includes an elongated ceramic member having longitudinal bores therewithin. A pair of wires extend the length of the bores, wherein one end of the wires are fused together and positioned adjacent to the substrate for temperature measurement purposes, and the opposing ends of the wires are connected to a controller. Typically, the ends of the wire opposite the temperature measuring ends exit the bores of the ceramic member and are bent, or crimped, and secured to the sheath surrounding the ceramic member in a substantially fixed manner. When the deposition processing step is taking place, the processing reactor is heated, thereby heating the ceramic member and the wires of the thermocouple. When heated, the wires expand longitudinally at a different rate than the ceramic, thereby causing longitudinal stresses in the wires. Because both ends of the wires are substantially fixed, after repeated cycles of heating and cooling the longitudinal stresses within the wires cause grain slip within the wires resulting in failure of the thermocouple. Accordingly, a thermocouple design that allows the wires located within the ceramic member to freely expand relative to the longitudinal expansion of the ceramic member is needed.

BRIEF SUMMARY OF THE INVENTION

In one aspect of the present invention, a thermocouple for use in a semiconductor processing reactor is provided. The thermocouple includes a sheath having a measuring tip an end thereof. The thermocouple further includes a support member disposed within the sheath, and the support member has at least two bores formed therethrough. A pair of wires is formed of dissimilar members are disposed within separate bores. A junction is formed between an end of each of the wires, and the junction is located adjacent to an end of the support member. The pair of wires are able to freely thermally expand or contract relative to the support member.

In another aspect of the present invention, a thermocouple for use in a semiconductor processing reactor is provided. The thermocouple includes a sheath and a support member, the support member being at least partially disposed within the sheath. The support member includes a first bore and a second bore, the first and second bores are formed substantially parallel to a longitudinal axis of the support member. The thermocouple further includes a first wire disposed within the first bore and a second wire disposed within the second bore. The first and second wires are formed of dissimilar metals. A junction is formed between an end of the first wire and an end of the second wire, wherein the junction is located adjacent to an end of the support member. A first loop is formed by a portion of the first wire adjacent to a location at which the first wire exits the first bore adjacent to an end of the support member opposite the junction. A second loop is formed by a portion of the second wire adjacent to a location at which the second wire exits the second bore adjacent to an end of the support member opposite the junction. The first and second loops are configured to allow the first and second wires to freely thermally expand in a longitudinal manner within the support member.

In yet another aspect of the present invention, a thermocouple for use in a semiconductor processing reactor is provided. The thermocouple includes a support member having at least one bore formed therein. A first wire is disposed within the first bore, and a second wire is disposed adjacent to the first wire in a spaced apart manner. The first and second wires are formed of dissimilar metals. The thermocouple also includes a junction formed between an end of the first wire and an end of the second wire, wherein the junction is located adjacent to an end of the support member. A first loop is formed by a portion of the first wire adjacent to an end of the support member opposite the junction, and a second loop is formed by a portion of the second wire adjacent to the first loop. The first and second loops are configured to allow the first and second wires to freely thermally expand or contract relative to the support member.

Advantages of the present invention will become more apparent to those skilled in the art from the following description of the embodiments of the invention which have been shown and described by way of illustration. As will be realized, the invention is capable of other and different embodiments, and its details are capable of modification in various respects. Accordingly, the drawing(s) and description are to be regarded as illustrative in nature and not as restrictive.

BRIEF DESCRIPTION OF SEVERAL VIEWS OF THE DRAWINGS

FIG. 4 is a segmented cross-sectional view of the thermocouple of FIG. 3;

FIG. 5A is an embodiment of a support member;

FIG. 5B is another embodiment of a support member;

FIG. 5C is yet another embodiment of a support member;

FIG. 5D is a further embodiment of a support member;

FIG. 5E is another embodiment of a support member;

FIG. 6 is an embodiment of a sheath;

FIG. 7A is an enlarged perspective view of a single-junction thermocouple;

FIG. 7B is an enlarged perspective view of a bi-junction thermocouple;

FIG. 7C is a side view of an alternate embodiment of a bi-junction thermocouple;

DETAILED DESCRIPTION OF THE PREFERRED EMBODIMENT

Figure 1:
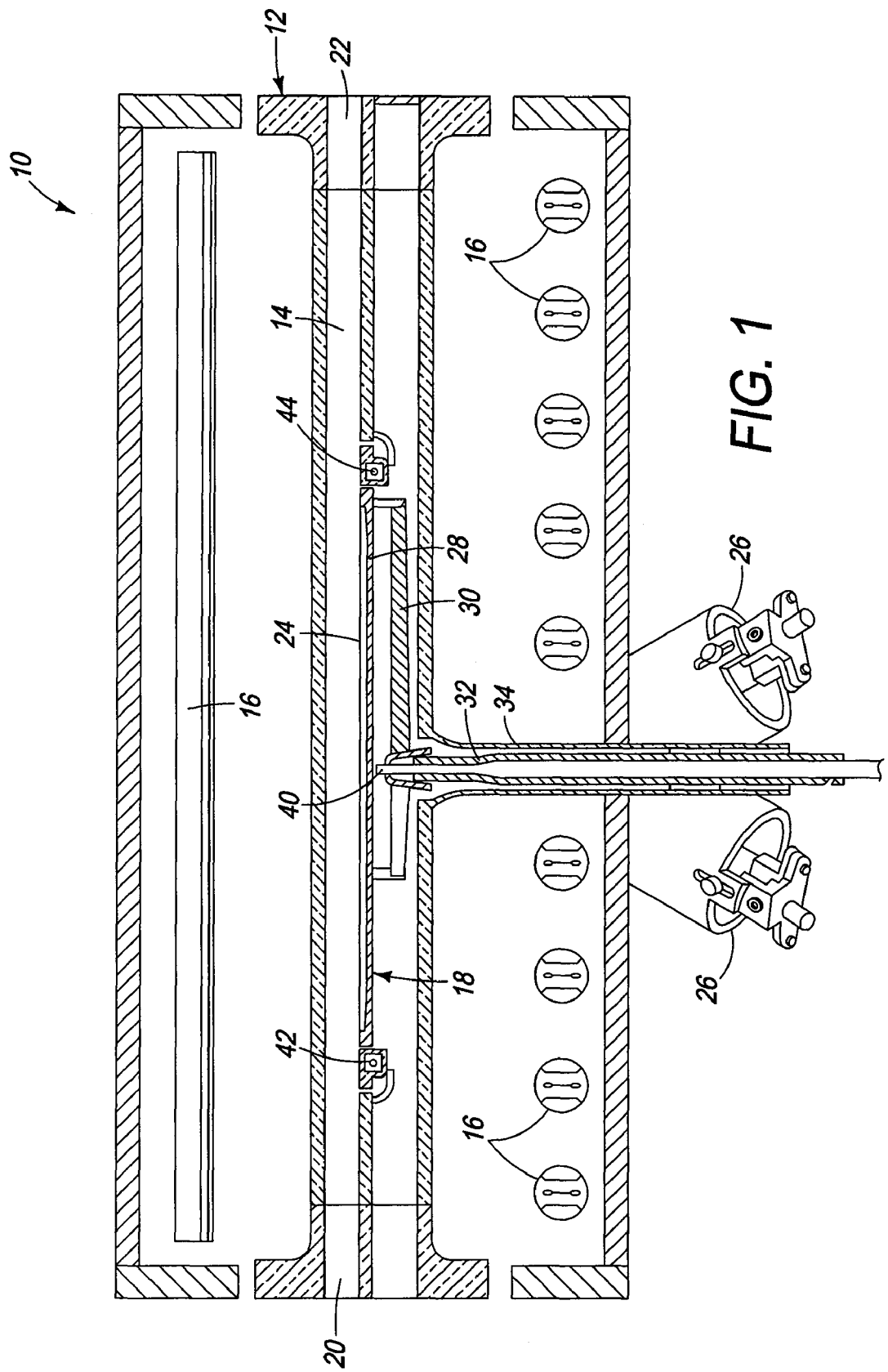
FIG. 1 is a cross-sectional view of an embodiment of a chemical vapor deposition reactor.

Referring to FIG. 1, an exemplary embodiment of a chemical vapor deposition ("CVD") reactor 10 is shown. While the illustrated embodiment is a single substrate, horizontal flow, cold-wall reactor, it should be understood by one skilled in the art that the thermocouple technology described herein may be used in other types of semiconductor processing reactors as well as other applications requiring accurate temperature sensors. The reactor 10 includes a reaction chamber 12 defining a reaction space 14, radiant heating elements 16 located on opposing sides of the reaction chamber 12, and a substrate support mechanism 18. The reaction chamber 12 is an elongated member having an inlet 20 for allowing reactant gases to flow into the reaction space 14 and an outlet 22 through which the reactant gases and process by-products exit the reaction space 14. In an embodiment, the reaction chamber 12 is formed of transparent quartz. It should be understood by one skilled in the art that the reaction chamber 12 may be formed of any other material sufficient to be substantially non-reactive with respect to the reactant gases introduced into the reaction chamber 12 and the process by-products resulting from a process reaction.

The heating elements 16 form an upper bank and a lower bank, as shown in FIG. 1. The heating elements 16 are oriented in a spaced-apart manner relative to adjacent heating elements 16 within the same bank. In an embodiment, the heating elements 16 of the upper bank are oriented substantially perpendicular relative to the heating elements 16 of the lower bank. The heating elements 16 provide radiant energy to the reaction chamber 12 without appreciable absorption by the walls of the reaction chamber 12. The heating elements 16 are configured to provide radiant heat of wavelengths absorbed by the substrate 24 being processed as well as portions of the substrate support mechanism 18. In an embodiment, a plurality of spot lamps 26 provide concentrated heat to the underside of the substrate support mechanism 18 to counteract a heat sink effect caused by cold substrate support structures extending upwardly through the bottom wall of the reaction chamber 12.

The substrate support mechanism 18 includes a substrate holder 28, upon which the substrate 24 may be disposed, and a support spider 30, as shown in FIG. 1. The support spider 30 is connected to a shaft 32 that extends downwardly through a tube 34 depending from the lower wall of the reaction chamber 12. A motor (not shown) is configured to rotate the shaft 32, thereby rotating the substrate holder 28 and substrate 24 in a like manner during a deposition process.

Figure 2:
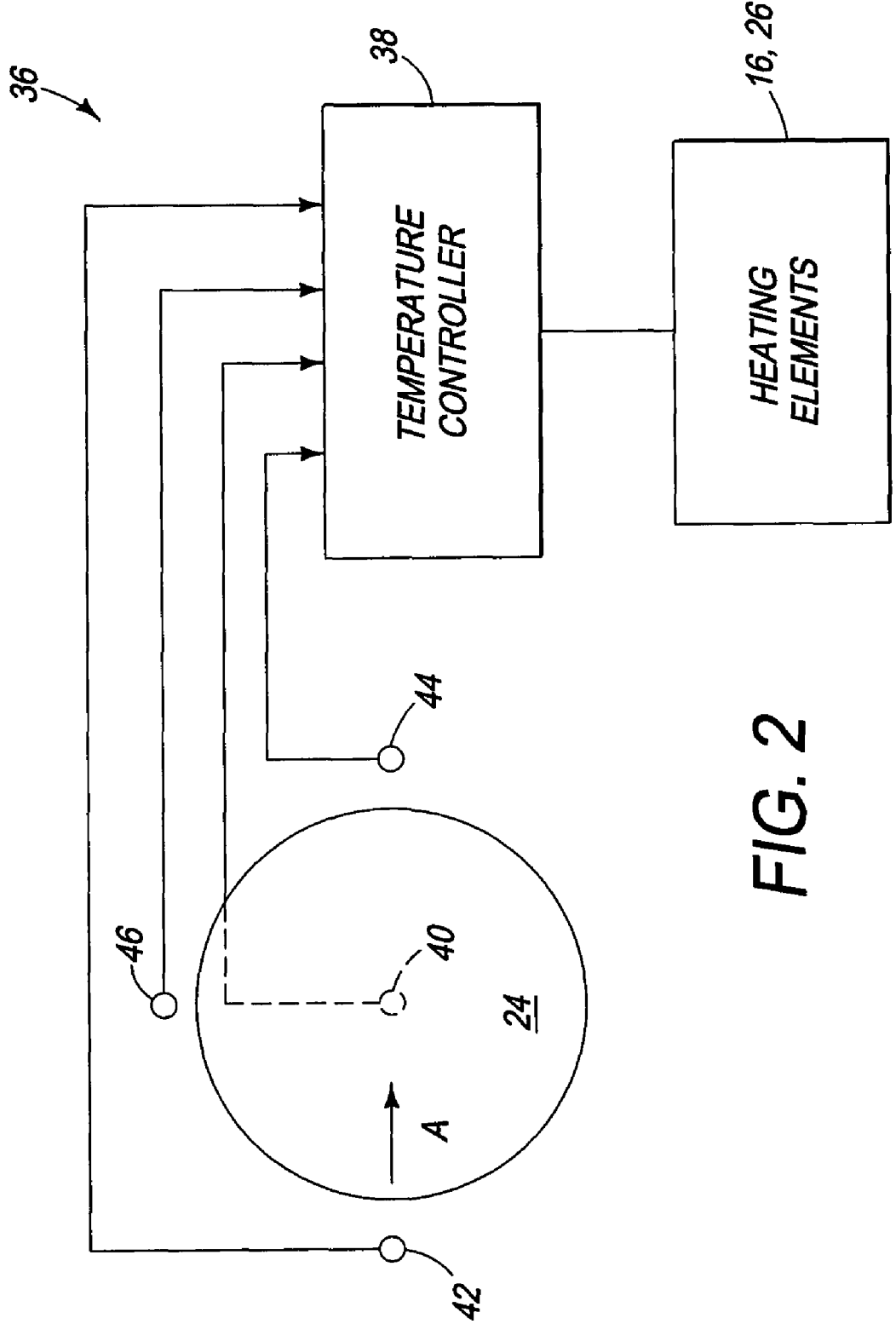
FIG. 2 is a schematic diagram of an embodiment of a temperature control system.

As illustrated in FIGS. 1-2, a temperature control system 36 for a chemical vapor deposition reactor 10 includes a plurality of temperature sensors located adjacent to a substrate 24 being processed, wherein the temperature sensors are operatively connected to a temperature controller 38 for providing temperature data at the particular location to the temperature controller 38. The temperature controller 38 is operatively connected to at least one heating element 16, 26 disposed adjacent to a substrate 24. The temperature controller 38 is configured to selectively adjust the energy emitted from the heating element(s) 16, 26 in response to data provided by the temperature sensors to maintain a substantially uniform temperature distribution across the entire substrate 24 being processed. It should be understood by one skilled in the art that the temperature control system 36 may include any number of temperature sensors disposed at different locations for providing data to the temperature controller 38. In the illustrated embodiment, the temperature control system 36 includes: a central temperature sensor 40 located adjacent to the lower surface of the substrate holder 28, a leading edge temperature sensor 42, a trailing edge temperature sensor 44, and at least one side edge temperature sensor 46. The leading and trailing edge temperature sensors 42, 44 are located front and rear edges of the substrate 24 relative to the direction of flow A of the reactant gases within the reaction space 14. The temperature sensors are configured to measure the temperature in the localized area immediately surrounding the location of the temperature sensor.

In an embodiment, at least one of the temperature sensors 40, 42, 44, 46 is a thermocouple 50, as illustrated in FIGS. 3-8. It should be understood by one skilled in the art that the other temperature sensors may be formed as optical pyrometers, thermocouples previously known in the art, or any combination thereof. In an embodiment, the thermocouple 50, as shown in FIGS. 3-8, includes a sheath 52, a support member 54, a first wire 56, a second wire 58, a collar 60, a biasing mechanism 62, a retainer assembly 64, and a connector 66. In an embodiment, the support member 54 is a generally elongated, cylindrical member having a longitudinal axis B, as illustrated in FIGS. 5A-5C. The support member 54 includes a first distal end 68 and an opposing second distal end 70. The support member 54 has a generally circular cross-section extending along nearly the entire length of the support member 54 extending from the first distal end 68.

Referring to FIG. 6, an embodiment of a sheath 52 for protecting and enveloping a portion of the support member 54 is shown. The sheath 52 is an elongated member having an opening 86 and a measuring tip 78. The support member 54 is inserted into the opening 86 such that the first distal end 68 of the support member 54 is located adjacent to the measuring tip 78, and the second distal end 70 of the support member 54 may extend beyond the opening 86 of the sheath 52. In an embodiment, the sheath 52 may be formed as a substantially linear member, but it should be understood by one skilled in the art that the sheath 52 may also be formed as a non-linear member.

In an embodiment, the support member 54 includes a pair of opposing cut-outs 72, as shown in FIG. 5A. The cut-outs 72 form a substantially rectangular cross-section of the support member 54 near the second distal end 70. Each cut-out 72 extends the entire distance between a location spaced apart from the second distal end 70 and the second distal end 70. Each cut-out 72 includes a curved portion 74 extending from the outer surface of the support member 54 toward the longitudinal axis B thereof. Each cut-out 72 further includes a substantially planar surface 76 extending from the curved portion 74 to the second distal end 70. In an alternative embodiment, the cut-outs 72 are formed as substantially linear tapers, wherein the entire tapered surfaces are substantially planar between a location spaced apart from the second distal end 70 and the second distal end 70. The cut-outs 72 allow the first and second wires 56, 58 to remain in a spaced-apart relationship in which the first and second wires 56, 58 are separated by the portion of the support member 54 located between the opposing cut-outs 72.

In another embodiment, the support member 54 includes a single cut-out 72, as illustrated in FIG. 5B. The cut-out 72 form a substantially semi-circular cross-sectional shape of the support member 54 near the second distal end 70. The cut-out 72 extends the entire distance between a location spaced apart from the second distal end 70 and the second distal end 70. The cut-out 72 includes a curved portion 74 extending from the outer surface of the support member 54 toward the longitudinal axis B thereof. The cut-out 72 further includes a substantially planar surface 76 extending from the curved portion 74 to the second distal end 70. The cut-out 72 allows the first and second wires 56, 58 to remain in a spaced-apart relationship to prevent the wires from shorting out.

In yet another embodiment, the support member 54 includes a pair of opposing cut-outs 72, as illustrated in FIG. 5C. Each cut-out 72 forms a detent in the support member 54 near the second distal end 70. Each cut-out 72 includes a pair of curved portions 74 extending from the outer surface of the support member 54 toward the longitudinal axis B thereof. Each cut-out 72 further includes a substantially planar surface 76 extending between the curved portions 74. The cut-outs 72 allow the first and second wires 56, 58 to remain in a spaced-apart relationship in which the first and second wires 56, 58 are separated by the portion of the support member 54 located between the opposing cut-outs 72. It should be understood by one skilled in the art that the cut-out 72 can be formed as any shape, provided the first and second wires 56, 58 remain separated.

In a further embodiment, the support member 54 is an elongated member having a pair of layered cut-outs 72 formed therein, as illustrated in FIG. 5D. The first pair of cut-outs 72 are similar to the pair of cut-outs 72 illustrated in FIG. 5A, wherein the first pair of cut-outs 72 extend to the second distal end 70 of the support member 54. The second pair of cut-outs 72' are formed into the planar surface 76 of the first pair of cut-outs 72. The second pair of cut-outs 72' extend to the second distal end 70 of the support member 54. The first pair of cut-outs 72 are separated by a central portion of the support member 54 and the second pair of cut-outs 72' are separated by a thinner section of the central portion of the support member 54. In another embodiment, illustrated in FIG. 5E, the support member 54 does not include any cut-outs formed therein. It should be understood by one skilled in the art that the support member 54 may include any number of cut-outs located at any location along the length of the support member 54 or adjacent to a distal end thereof.

In an embodiment, the support member 54 is formed of ceramic. It should be understood by one skilled in the art that the support member 54 may be formed of any type of material sufficient to withstand the cyclic temperature variations as well as the range of temperatures to which the thermocouple 50 is exposed. It should also be understood by one skilled in the art that although the illustrated thermocouple 50 is substantially linear, the thermocouple 50 may be formed of any shape sufficient to allow the measuring tip 78 of the thermocouple 50 to be disposed at a desired location for a localized temperature measurement.

In an embodiment, the support member 54 further includes a first bore 80 and a second bore 82, as shown in FIG. 5A. The first and second bores 80, 82 are formed in the first distal end 68 and extend substantially parallel to the longitudinal axis B through the support member 54. Each of the first and second bores 80, 82 extend from the first distal end 68 to a cut-out 72. The first and second wires 56, 58 exit the first and second bores 80, 82 at the location at which the first and second bores 80, 82 intersect with a cut-out 72 such that the first and second wires 56, 58 exit the corresponding bores 80, 82 at a location spaced apart from the second distal end 70 of the support member 54 and are maintained in a spaced apart relationship by the portion of the support member 54 between the opposing cut-outs 72.

In the embodiment illustrated in FIG. 5B, the support member 54 includes a first bore 80 and second bore 82. The second bore 82 extends the entire length of the support member 54 between the first distal end 68 and the second distal end 70, and the first bore 80 extends only a portion of the longitudinal distance of the support member 54, wherein the first bore 80 extends from the first distal end 68 of the support member 54 to the location where the first bore 80 intersects with the cut-out 72. The first bore 80 is configured to receive the first wire 56, and the second bore 82 is configured to receive the second wire 58. The first wire 56 exits the first bore 80 at a spaced apart location relative to the second distal end 70 of the support member where the second wire 58 exits the second bore 82. The spaced apart relationship at which the first and second wires 56, 58 exit the corresponding bores 80, 82 assist in reducing or eliminating the likelihood of a short circuit between the wires 56, 58.

FIG. 5C illustrates another embodiment of a support member 54 that includes a first bore 80 and a second bore 82 formed therethrough. Each bore 80, 82 extends from the first distal end 68 of the support member 54 to a location spaced apart from the second distal end 70 in which the first and second bores 80, 82 intersect a corresponding cut-out 72 formed into the support member 54. The bores 80, 82 are separated by the central portion of the support member 54 between the cut-outs 72. Each bore 80, 82 is configured to receive one of the first or second wires 56, 58, and the wires exit the corresponding bore 80, 82 at the location where the bores 80, 82 intersect the cut-outs 72.

In yet another embodiment, illustrated in FIG. 5D, the support member 54 includes a first bore 80, a second bore 82, a third bore 81, and a fourth bore 83 formed along the longitudinal axis thereof. Each bore 80, 82, 81, 83 is configured to receive a wire 56, 58, 57, 59 (FIG. 7C) therein. For example, in an embodiment shown in FIG. 7B, the first bore 80 is configured to receive the first wire 56; the second bore 82 is configured to receive the second wire 58; the third bore 81 is configured to receive the third wire 57; and the fourth bore 83 is configured to receive the fourth wire 59. Each of the bores 80, 82, 81, 83 extends from the first distal end 68 of the support member 54. The first and fourth bores 80, 83 extend from the first distal end 68 to the intersection between the bores 80, 83 and the corresponding first cut-outs 72, and the second and third bores 82, 81 extend from the first distal end 68 to the intersection between the bores 82, 81 and the corresponding second cut-outs 72'. The first and fourth wires 56, 59 exit the bores 80, 83 at a location spaced apart from the second distal end 70 of the support member 54 and are maintained in a spaced apart relationship by the portion of the support member 54 between the first pair of cut-outs 72, and the second and third wires 58, 57 exit the bores 82, 81 at a location spaced a smaller distance apart from the second distal end 70 than the location at which the first and fourth wires 56, 59 exit their corresponding bores and the wires 56, 59 are separated by the portion of the support member 54 between the second pair of cut-outs 72'.

In another embodiment, illustrated in FIG. 5E, includes a single bore 80 formed along the longitudinal axis thereof. The bore 80 is configured to receive a single wire therein, and at least one other wire can be located adjacent to the outer surface of the support member 54 that is aligned substantially parallel to the first wire within the bore 80. The wire received in the bore 80 and the wire extending external to the support member 54 can be fused adjacent to the first distal end 68 of the support member 54 to form a junction 84 therebetween.

In the embodiment illustrated in FIG. 7A, the first bore 80 of the support member 54 is configured to receive the first wire 56, and the second bore 82 is configured to receive the second wire 58. In an embodiment, a portion of the first and second wires 56, 58 extend beyond the first distal end 68 of the support member 54. The portion of the first and second wires 56, 58 that extends beyond the first distal end 68 are fused together to form an electrical connection, or junction 84, therebetween.

In the embodiment illustrated in FIGS. 5D and 7B, the support member 54 includes four bores 80, 82, 81, 83 formed therein, and each bore is configured to receive a wire 56, 58, 57, 59. The first pair of wires 56, 58 are fused together adjacent to the first distal end 68 of the support member 54 to form a first junction 84, and the second pair of wires 57, 59 are fused together adjacent to the first distal end 68 of the support member 54 to form a second junction 84' that is spaced apart from the first junction 84 to prevent a short circuit therebetween. In an embodiment, the ends of the wires 56, 58 (and 57, 59) are melted together. It should be understood by one skilled in the art that any method of fusing the ends of the first and second wires 56, 58 and/or the third and fourth wires 57, 59 to provide an electrical connection therebetween can be used. It should be understood by one skilled in the art that any number of junctions 84 can be formed adjacent to the first distal end 68 of the support member 54, provided the junctions 84 remain spaced apart to prevent a short circuit therebetween.

In another embodiment, illustrated in FIG. 7C, the support member 54 may include a cut-out 72 located along the length thereof. The cut-out 72 is configured to intersect only two bores formed through the support member 54. For example, the illustrated cut-out 72 intersects the third and fourth bores 81, 83 such that the third and fourth wires 57, 59 exit the bore 81, 83 at the location at which the bores 81, 83 intersect the cut-out 72. In the illustrated embodiment, the first and second wires 56, 58 are fused together to form a first junction 84 disposed adjacent to the first distal end 68 of the support member 54, and the third and fourth wires 57, 59 are fused together to form a second junction 84' located adjacent to the cut-out 72 formed along the length of the support member 54. The second junction 84' provides the thermocouple 50 with a second junction for measuring two distinct localized temperatures that are spaced apart from each other, or forming a bi-junction thermocouple. It should be understood by one skilled in the art that the second junction 84' can be formed adjacent to the first distal end 68 of the support member 54 (FIG. 7B) or at any location along the length of the support member 54 (FIG. 7C or similar thereto). It should also be understood by one skilled in the art that there can be any number of junctions formed along the length of the support member 54 to provide localized temperature measurements at different locations along the length of the thermocouple 50.

As shown in FIG. 7A, the bonded wires form a junction 84 located immediately adjacent to the first distal end 68 of the support member 54. In an embodiment, the first and second wires 56, 58 are formed of dissimilar metals to form a thermocouple therebetween. In an embodiment, the first wire 56 is formed of platinum, and the second wire 58 is formed of a platinum alloy having 13% rhodium. It should be understood by one skilled in the art that the first and second wires 56, 58 can be formed of any dissimilar metals sufficient to form a thermocouple therebetween. In another embodiment, three wires extend the length of the support member 54, and a junction is formed between the three wires. The first and second wires are formed of either Platinum or a Platinum-Rhodium alloy and the third wire (not shown) is formed of the other of Platinum or Platinum-Rhodium alloy. A junction is formed between the three wires such that the thermocouple includes a redundant wire in case one of the two wires formed of the same material fails. The third wire may be received by a third bore (not shown) formed through the support member 54, or the third wire is located adjacent to the outer surface of the support member 54 in which the third wire remains spaced apart from the first and second wires 56, 58. It should also be understood by one skilled in the art that the thermocouple may include any number of wires that can form any number of junctions therebetween.

In an embodiment, the junction 84 between the first and second wires 56, 58 is disposed in a spaced apart relationship and adjacent to inner surface of the sheath 52 at the measuring tip 78. In an embodiment, the junction 84 is in contact with the inner surface of the sheath 52 at the measuring tip 78. It should be understood by one skilled in the art that the greater the distance that the junction 84 is spaced from the measuring tip 78 disposed at a particular location to be measured, the less accurate the temperature measurement becomes at the particular location.

In an embodiment, the diameter of each of the first and second wires 56, 58 is about 0.010 inches. In another embodiment, the diameter of each of the first and second wires 56, 58 is about 0.014 inches. It should be understood by one skilled in the art that the first and second wires 56, 58 can be formed of any diameter. It should also be understood by one skilled in the art that the first wire 56 and the second wire 58 may have different diameters. The first and second bores 80, 82 are sized and shaped to receive the first and second wires 56, 58, respectively, while allowing the first and second wires 56, 58 to thermally expand or contract radially and axially therewithin. Accordingly, first and second bores 80, 82 have a cross-sectional area that is slightly larger than the cross-sectional area of the first and second wires 56, 58.

Figure 3:
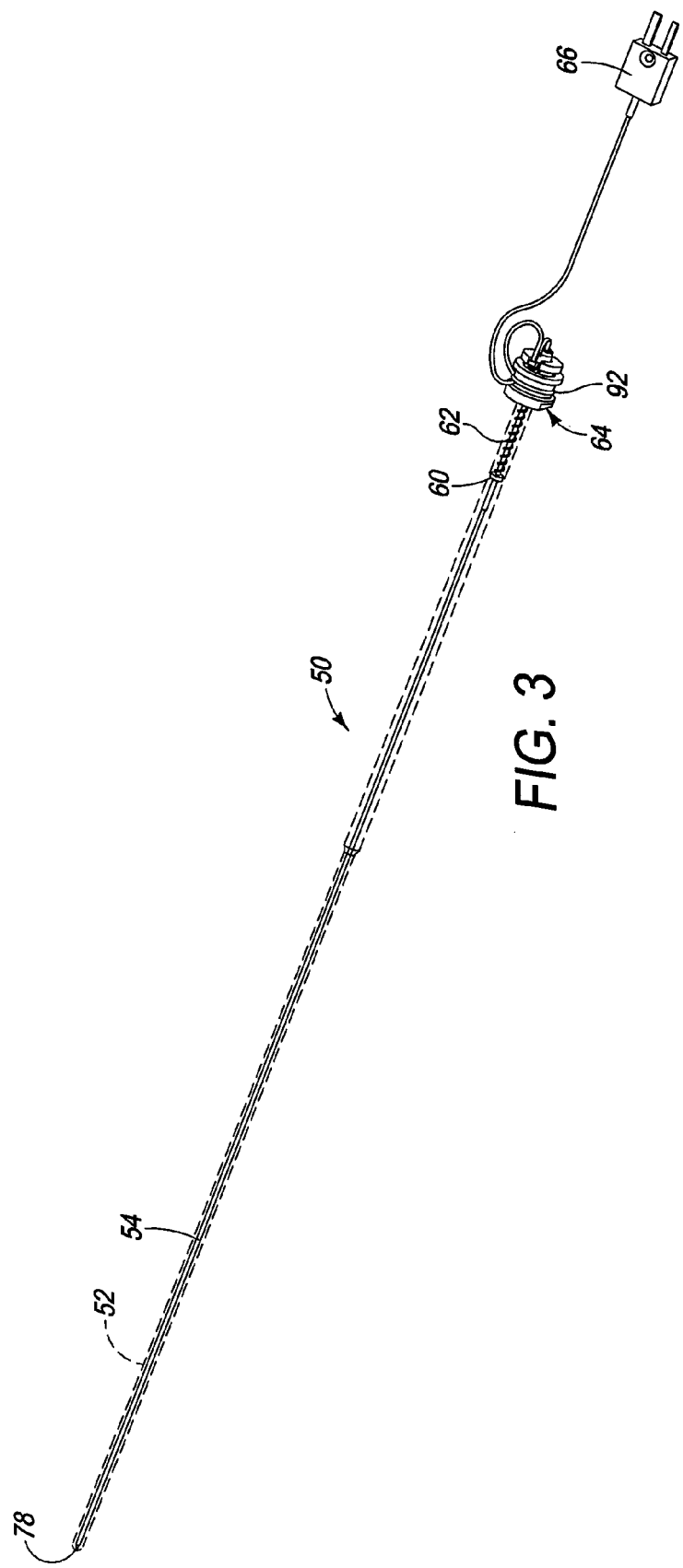
FIG. 3 is a perspective view of an embodiment of a thermocouple of the present invention.

The support tube 54 is at least partially disposed within a protective sheath 52, as shown in FIGS. 3-4. The second distal end 70 of the support member 54 extends outwardly beyond the opening 86 of the sheath 52. In an embodiment, the sheath 52 is formed of a transparent quartz material. The sheath 52 has the same general cross-sectional shape as the support member 54 disposed therewithin, but the sheath 52 has a slightly larger cross-sectional shape to provide a gap between the inner surface of the sheath 52 and the outer surface of the support member 54. The sheath 52 includes a measuring tip 78 at one end thereof and an opening 86 at the opposing end thereof. In another embodiment, the sheath 52 may be coated with silicon nitride (SiN) or have other surface treatments applied thereto to extend the life of the sheath during chemical vapor deposition ("CVD") processing in the reaction chamber 12. In yet another embodiment, a cap (not shown), such as a silicon-carbide (SiC) cap, is applied at the measuring tip 78 of the sheath 52 to provide better heat transfer between the ambient environment and the first and second wires 56, 58.

The first and second wires 56, 58 extend from the junction 84 through the spaced-apart bores 80, 82 formed in the support member 54 and exit the first and second bores 80, 82 adjacent at the intersection of the first and second bores 80, 82 with the cut-outs 72 or the second distal end 70 of the support member 54, as shown in FIGS. 4, 7, and 8A-8B. As shown in FIGS. 3-4, a collar 60 is operatively connected to the outer surface of the support member 54 at a spaced-apart distance from the second distal end 70 of the support member 54. In an embodiment, the collar 60 is formed separately from the support member 54 and later fixedly attached to the support member 54. In another embodiment, the support member 54 and the collar 60 are formed as a single member. In an embodiment, at least a portion of the collar 60 contacts the inner surface of the sheath 52 to ensure that the support member 54 has little, if any, lateral movement within the sheath 52.

A retainer assembly 64, as shown in FIGS. 3-4 and 8A-8B, is disposed within the opening 86 of the sheath 52 and is configured to secure a portion of the first and second wires 56, 58. In an embodiment, the retainer assembly 64 includes a plug 88 and a ring 90. The plug 88 is configured to be inserted into the opening 86 of the sheath 52, but a portion of the plug 88 extends beyond the end of the sheath 52. The plug 88 includes an aperture 91 adapted to receive the support member 54. The thickness of the portion of the plug 88 inserted into the opening 86 of the sheath 52 is slightly less than the distance between the outer surface of the support member 54 and the inner surface of the sheath 52, thereby allowing the support member 54 to freely translate within the plug 88 along the longitudinal axis B of the support member 54.

Figure 8A:
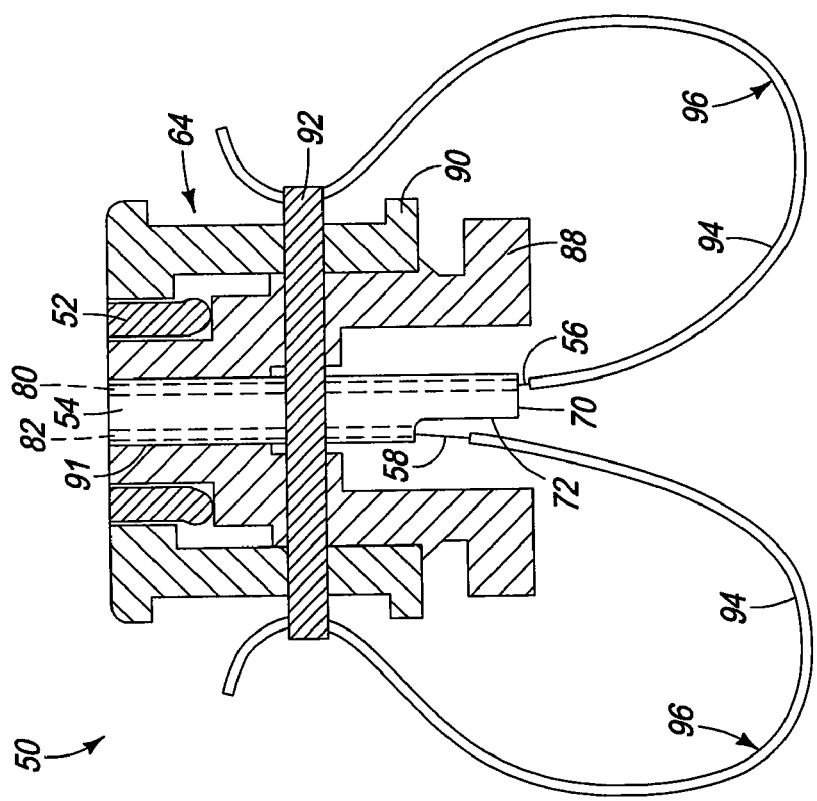
FIG. 8A is a magnified, cross-sectional view of an embodiment of a retainer assembly and support member.
Figure 8B:
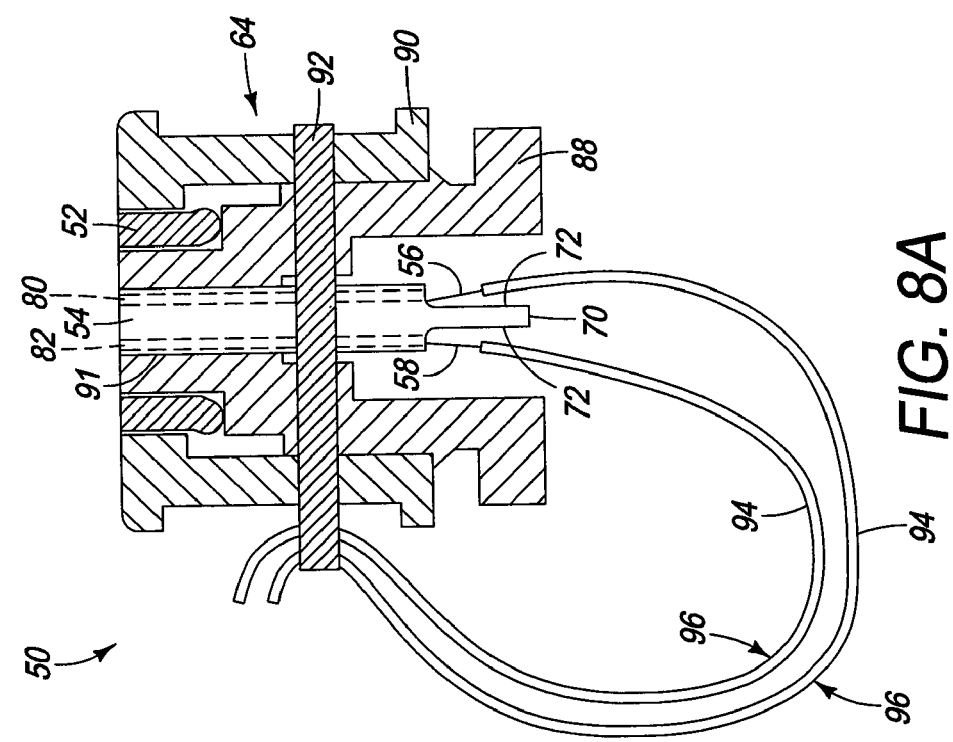
FIG. 8B is a magnified, cross-sectional view of another embodiment of a retainer assembly and support member.

In an embodiment, the ring 90 of the retainer assembly 64 is configured to envelop the plug 88 as well as the end of the sheath 52 adjacent to the opening 86, as shown in FIGS. 4 and 8A-8B. The ring 90 is secured to the plug 88 and the sheath 52 by a shrink ring 92. The shrink ring 92 provides a compression force to the outer surface of the ring 90, thereby squeezing the sheath 52 and plug 88 within the ring 90. The compression force applied by the shrink ring 92 likewise secures the plug 88 within the sheath 52, thereby preventing the portion of the plug 88 within the sheath 52 from becoming disengaged from the opening 86 of the sheath 52 but still allowing the support member 54 to freely translate within the plug 88. In another embodiment, the thermocouple 50 does not include the retainer assembly 64 or biasing mechanism 62 (as described below), but instead the support member 54 is operatively secured to sheath 52 in a substantially fixed manner (not shown) to prevent the support member 54 from shifting or becoming removed relative to the sheath 52 while allowing the wires 56, 58 to freely thermally expand or contract relative to the support member 54. It should be understood by one skilled in the art that the retainer assembly 64 shown and described as an exemplary embodiment of how the support member 54 can be secured to prevent substantial movement of the support member 54 relative to the sheath 52.

As illustrated in FIG. 4, a biasing mechanism 62, such as a spring or the like, is located within the sheath 52 and surrounding a portion of the support member 54. The biasing mechanism 62 extends between the collar 60 and the end of the portion of the plug 88 located within the sheath 52. Because the plug 88 is secured to the end of the sheath 52 and the support member 54 is freely translatable relative to the plug 88, the biasing mechanism 62 provides a biasing force against the collar 60 secured to the support member 54. The biasing force of the biasing mechanism 62 causes the support member to be biased toward the measuring tip 78 of the sheath 52 until the junction 84 of the first and second wires 56, 58 adjacent to the first distal end 68 of the support member 54 contacts the inner surface of the sheath 52 at the measuring top 78. The biasing mechanism 62 provides a sufficient amount of biasing force to maintain the junction 84 in contact with the inner surface of the sheath 52 at the measuring tip 78. While the preceding description of the retainer assembly 64 included only a plug 88 and a ring 90, it should be understood by one skilled in the art that the retainer assembly 64 may be formed of a single member or more than two members. It should be understood by one skilled in the art that the retainer assembly 64 is configured to be secured to the sheath 52 and assist in biasing the junction 84 against the inners surface of the sheath 52 at the measuring tip 78 while also assisting in maintaining a separation between the exposed portions of the wires of the thermocouple as they exit the support member 54.

While one end of the first and second wires 56, 58 are fused together to form the junction 84 adjacent to the first distal end 68 of the support member, the first and second wires 56, 58 exit the first and second bores 80, 82 of the support member 54 adjacent to the second distal end 70 of the support member 54 such that the opposing ends of the first and second wires 56, 58 are connected to a connector 66 (FIG. 3). As illustrated in the embodiment shown in FIG. 8A, the first wire 56 exits the first bore 80 at the intersection between the first bore 80 and the cut-out 72, and the second wire 58 exits the second bore 82 at the intersection between the second bore 82 and the opposing cut-out 72. As illustrated in the embodiment shown in FIG. 8B, the first wire 56 exits the first bore 80 at the intersection between the first bore 80 and the cut-out 72, and the second wire 58 exits the second bore at the second distal end 70 of the support member 54.

A Teflon® tube 94 is disposed over nearly the entire exposed portion of both the first and second wires 56, 58 located between the support member 54 and the connector 66. It should be understood by one skilled in the art that the tubes 94 can be formed of any material sufficient to provide a protective and/or insulative covering over the wire disposed therewithin. The tube 94 allows a portion of the first and second wires 56, 58 located outside the first and second bores 80, 82 to remain exposed. Because the first and second wires 56, 58 thermally expand and contract along the longitudinal axis B of the support member 54, the portion of exposed wire allows the wires to expand and contract without the tube 94 interfering with the expansion or contraction thereof. The amount of the first and second wires 56, 58 that remain exposed may vary, but the amount remaining exposed should be minimized to reduce or eliminate the possibility that the exposed portions of the first and second wires 56, 58 touch and cause a short circuit.

FIG. 8A illustrates one embodiment of an assembled thermocouple 50 in which the support member 54 includes opposing cut-outs 72 that intersect the first and second bores 80, 82 at a location spaced apart from the second distal end 70 of the support member 54. The Teflon® tubes 94 surround the first and second wires 56, 58 as the wires exit the first and second bores 80, 82, but a portion of the first and second wires 56, 58 remain exposed. The exposed portion of each of the first and second wires 56, 58 remains separated from the other by way of the support member 54 extending between the opposing cut-outs 72. This portion of the support member 54 between the cut-outs 72 ensures that the exposed portion of each of the first and second wires 56, 58 are not able to contact each other, thereby preventing a short circuit. Further, the tubes 94 allow a portion of the first and second wires 56, 58 to remain exposed, thereby allowing the first and second wires 56, 58 to freely thermally expand and contract in the radial and longitudinal manners. As the first and second wires 56, 58 extend from the support member 54, the first and second wires 56, 58 are secured at the same location on the outer surface of the ring 90 by way of the shrink ring 92, thereby securing the wires 56, 58 for packaging as well as allowing the wires 56, 58 to freely thermally expand. The first and second wires 56, 58 each form a loop 96 between the location at which they exit the first and second bores 80, 82 and the location at which they are secured to the ring 90. Both loops 96 have a substantially similar radius of curvature. In an embodiment, the radius of curvature of the loops 96 is about 2-25 mm. It should be understood by one skilled in the art that the radius of curvature of the loops 96 may by larger or smaller. It should also be understood by one skilled in the art that the radius of curvature of the loop 96 formed by the first wire 56 may be different than the radius of curvature of the loop 96 formed by the second wire 58.

FIG. 8B illustrates another embodiment of an assembled thermocouple 50 in which the support member 54 includes a single cut-out 72 that intersect the second bore 82 at a location spaced apart from the second distal end 70 of the support member 54. The Teflon® tubes 94 surround the first and second wires 56, 58 as the wires exit the first and second bores 80, 82, but a portion of the first and second wires 56, 58 remain exposed. The exposed portion of each of the first and second wires 56, 58 remains separated from the other by way of the support member 54 as well as the distance between the locations at which the first and second wires 56, 58 exit the first and second bores 80, 82. The between the exposed portions of the first and second wires 56, 58 ensures that the exposed portion of each of the first and second wires 56, 58 are not able to contact each other, thereby preventing a short circuit. Further, the tubes 94 allow a portion of the first and second wires 56, 58 to remain exposed, thereby allowing the first and second wires 56, 58 to freely thermally expand and contract in the radial and longitudinal manners. As the first and second wires 56, 58 extend from the support member 54, the first and second wires 56, 58 are secured at opposing locations on the outer surface of the ring 90, thereby maintaining the exposed portion of each of the first and second wires 56, 58 in a spaced apart manner. The first and second wires 56, 58 each form a loop 96 between the location at which they exit the first and second bores 80, 82 and the location at which they are secured to the ring 90. Both loops 96 have a substantially similar radius of curvature. In an embodiment, the radius of curvature of the loops 96 is about 2-25 mm. It should be understood by one skilled in the art that the radius of curvature of the loops 96 may by larger. It should also be understood by one skilled in the art that the radius of curvature of the loop 96 formed by the first wire 56 may be different than the radius of curvature of the loop 96 formed by the second wire 58.

The first and second wires 56, 58 are received within the bores of the support member 54 in such a manner that the wires are able to freely expand and contract in both the radial and axial directions as a result of thermal expansion or contraction. Historically, the first and second wires 56, 58 have been bent and secured immediately upon exiting the bores of the support member 54, thereby preventing the wires from being able to expand in the longitudinal direction. Because the wires were unable to adequately expand in the longitudinal direction, repeated heating and cooling of the thermocouple 50 caused grain slip in the wires within the support member 54, thereby causing the thermocouple 50 to fail. The loops 96 formed as the wires exit the bores in the support member ensure that the wires are able to freely expand and contract in both the axial and longitudinal directions, wherein grain slip due to the wires being fixed at both ends within the support member 54 is eliminated. Further, the exposed portion of each wire as the wire exits the support member 54 is separated from the exposed portion of the other wire by a physical barrier, such as the support member 54 (FIG. 8A), spatially, such as the offset between the exposed portions (FIG. 8B), or any other means whereby the exposed portions remain separated during operation of the thermocouple 50.

While preferred embodiments of the present invention have been described, it should be understood that the present invention is not so limited and modifications may be made without departing from the present invention. The scope of the present invention is defined by the appended claims, and all devices, process, and methods that come within the meaning of the claims, either literally or by equivalence, are intended to be embraced therein.

What is claimed is:

1. A thermocouple for use in a semiconductor processing reactor, said thermocouple comprising:
   a sheath;
   a support member at least partially disposed within said sheath, said support member having a first bore and a second bore formed substantially parallel to a longitudinal axis of said support member;
   a first cut-out formed into said support member that intersects with said first bore at a location spaced apart from an end of said support member such that said first bore extends less than a length of said support member;
   a first wire disposed within said first bore;
   a second wire disposed within said second bore, said second wire formed of a dissimilar metal than said first wire;
   a second cut-out formed in said support member,
   wherein said first wire exiting said first bore at an intersection between said first bore and said first cut-out and said second wire exiting said second bore at an intersection between said second bore and said second cut-out;
   a junction formed between an end of said first wire and an end of said second wire, wherein said junction is located adjacent to an end of said support member;
   a first loop formed by a portion of said first wire adjacent to a location at which said first wire exits said first bore adjacent to an end of said support member opposite said junction; and
   a second loop formed by a portion of said second wire adjacent to a location at which said second wire exits said second bore adjacent to an end of said support member opposite said junction;

wherein said first and second loops are configured to allow said first and second wires to freely thermally expand in a longitudinal manner within said support member.

2. The thermocouple of claim 1, wherein said first loop has a radius of curvature substantially equal to a radius of curvature of said second loop.

3. The thermocouple of claim 1, wherein said first loop has a radius of curvature different than a radius of curvature of said second loop.

4. The thermocouple of claim 1, wherein said intersection between said first bore and said first cut-out is spaced apart from an end of said support member a substantially equal distance as said intersection between said second bore and said second cut-out.

5. The thermocouple of claim 1, wherein said intersection between said first bore and one of said cut-outs is spaced apart from an end of said support member a different distance as said intersection between said second bore and said second cut-out.

6. The thermocouple of claim 1, wherein said first wire exits said first bore at substantially the same distance from an end of said support member as said second wire exits said second bore relative to said end of said support member.

7. The thermocouple of claim 1, wherein said first wire exits said first bore at a different distance from an end of said support member as said second wire exits said second bore relative to said end of said support member.

8. The thermocouple of claim 1, wherein said first wire exits said first bore at a first location and said second wire exits said second bore at a second location, and said first location is spatially or physically separated from said second location to prevent a short circuit between said first and second wires.

9. The thermocouple of claim 1, wherein said radius of curvature of said first and second loops are at least 2 mm.

10. The thermocouple of claim 9, wherein said radius of curvature of said first and second loops are between 2 and 25 mm.

* * * * *